May 7, 1968     E. ANTTILA     3,381,985
CORNER JOINT BETWEEN TWO TIMBER BEAMS
Filed Jan. 18, 1965     2 Sheets-Sheet 1

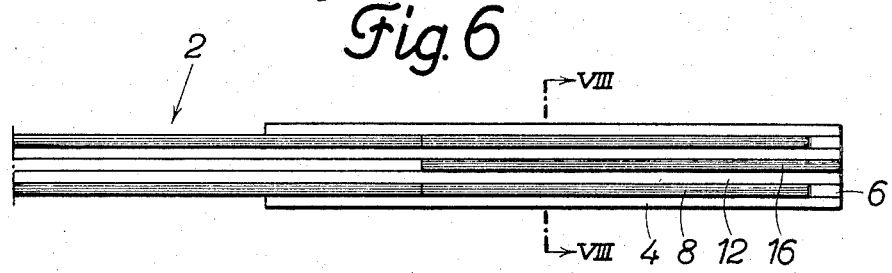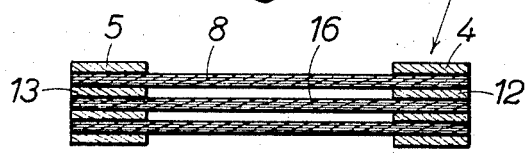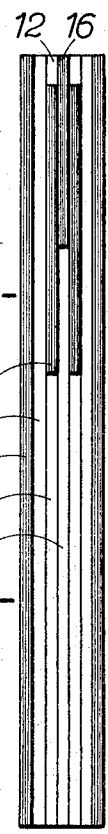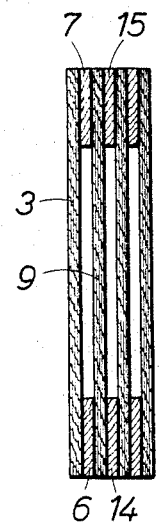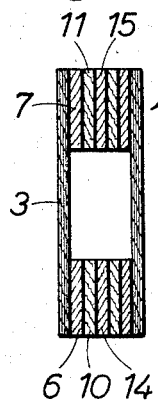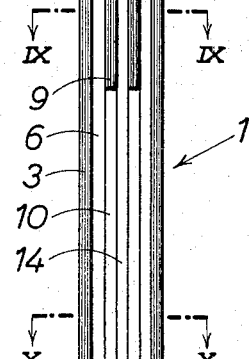

United States Patent Office 3,381,985
Patented May 7, 1968

3,381,985
CORNER JOINT BETWEEN TWO TIMBER BEAMS
Erkki Anttila, Isokaari 32C, Helsinki 20, Finland
Filed Jan. 18, 1966, Ser. No. 521,367
4 Claims. (Cl. 287—20.92)

ABSTRACT OF THE DISCLOSURE

A corner joint between two timber beams formed by a plurality of adhesively secured layers, each of which includes a plywood panel extending longitudinally in one of the beams, and a plank extending in the lengthwise direction of the other beam and secured to the marginal edge of a panel of an adjacent layer along the outer edge of the corner joint.

---

Figure 1:
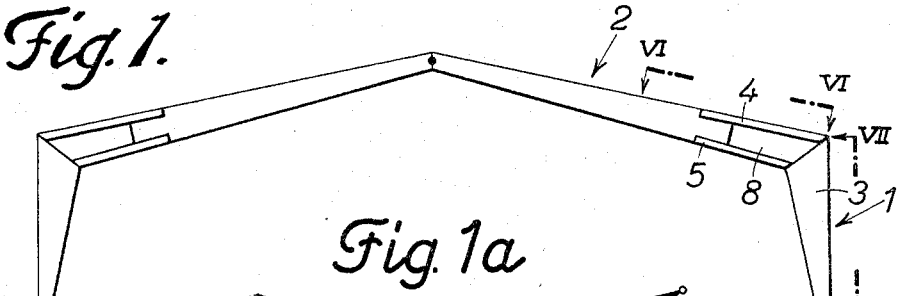

This invention relates to a corner joint between two timber beams which are perpendicular to each other and constituted by layers running parallel to the plane of each beam, the layers overlapping one another near the corner joint in such a way that one layer of one beam is adjoined by one layer of the other beam and both layers are joined to each other by glueing.

Similar corner joints are used, for example, in structural frames such as triple-joint or double-joint frames. A horizontal beam carries the weight of a roof which gives rise to bending stresses in the corner joint which in turn are converted into shearing forces inside the joint.

Panels, planks or the like have in the past been used for the production of such joints as these. Due to the shearing forces inside the corner joint, the joint itself has had to be made particularly solid between two beams. Since the shearing forces act parallel to the plane of the joints, i.e. the wood used to make the corner joint has a tendency to split, it is clear that joints such as these are unable to withstand intensive stressing because their shear strength in the direction of the constituent fibres of the wood is extremely low. For this reason, frames manufactured with the aid of these joints have a limited free span.

An object of the present invention is to obviate these disadvantages and to provide a corner joint which is able to withstand the same loads as the known joints, but which at the same time makes possible a much lighter construction. On the other hand, it is possible by means of the corner joint according to the invention to manufacture structural frames with a considerable free span without any need for the frame to be excessively solid. The invention is characterized by the fact that the layers of the beams near the joint are constituted at least in part of a plywood panel of which, the fibres of the outer surface ply or veneer run in substantially the same direction as the beam with which the plywood panel is associated. Additionally a longitudinal plank extends from each panel in the lengthwise direction of the other beam. The advantage of the corner joint according to the invention over the known corner joints is primarily that the shear strength of the plywood is about six times as high as the shear strength of the constituent wood in the direction of the fibres, as proven by tests. By virtue of the fact that the fibres of the surface veneer of the plyood panel run in substantially the same direction as the beam to which the plywood panel is associated, each layer has the same modulus of elasticity near the corner joint, as a result of which the strength of each layer is fully utilized.

According to one preferred embodiment of the invention, the plank is positively relative to its associated panel to lie along a longitudinal marginal edge of the panel of the adjacent layer, at the outer edge of the corner joint. As a result, the strength of the corner joint is further increased because the planks rest on those edges of the corner joint subject to tensile stresses and because as already known the tensile strength of wood in the direction of its constituent fibers is relatively high.

Figure 1A:
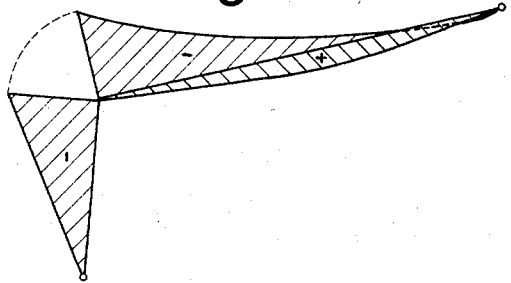

The accompanying drawings, show one embodiment of the invention wherein:

FIGURE 1 is an elevation view of a triple-joint frame,
FIGURE 1a shows a moment distribution on such a frame,
FIGURES 2 to 5 are each side elevations of the various plywood layers of the corner joint of a triple-joint frame,
FIGURE 6 is a section through the corner joint taken on the line VI—VI of FIGURE 1,
FIGURE 7 is a section through the corner joint taken on the line VII—VII of FIGURE 1,
FIGURE 8 is a sectional view taken on the line VIII—VIII of FIGURE 6,
FIGURE 9 is a sectional view taken on the line IX—IX of FIGURE 7,
FIGURE 10 is a sectional view taken on the line XX—XX of FIGURE 7.

Figure 2:
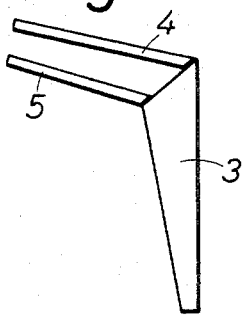
Figure 3:
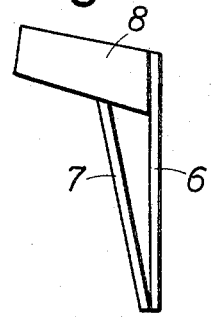
Figure 4:
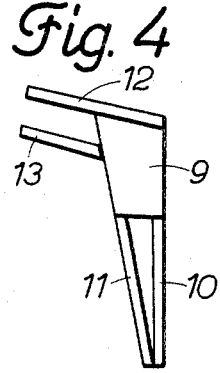
Figure 5:
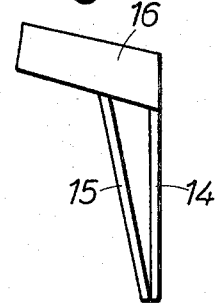

In the drawing, the reference 1 denotes a substantially vertical beam and the reference 2 a substantially horizontal beam. The beams 1 and 2 are joined together by means of the corner joint according to the invention. The structure of this corner joint can be best explained with reference to the method by which it is assembled. The plywood section 3 together with two planks 4 and 5 are arranged in a glue press in the relative positions shown in FIGURE 2. The next layer to be applied consists of two planks 6 and 7 and a plywood section 8. The next or third layer is constituted by a plywood section 9 and two planks 10 and 11 forming part of beam 1, and two planks 12 and 13 which, as shown in FIGURE 4, project into the substantially horizontal beam 2. Two planks 14 and 15 together with a plywood panel 16 are then applied as the fourth or middle layer, as shown in FIGURE 5. Since the corner joint is symmetrical on the center plane of the beams 1 and 2, another layer is applied to the center layer as shown in FIGURE 4, which in turn receives another layer as shown in FIGURE 3 and finally yet another layer as shown in FIGURE 2. The surface of the top layer, the bottom of the final layer and both faces of all the other layers are coated with glue before being fitted together. The assembly thus formed is then subjected to compression alone or together with other similar assemblies placed one above the other. When the glue has hardened, the corner joint between one substantially vertical and one substantially horizontal beam is complete.

In this embodiment, the corner joint consists mainly of the entire, substantially vertical beam 1 and of part of the substantially horizontal beam 2. To facilitate transport, the other part of the horizontal beam is fitted at the assembly site. The continuation of the horizontal beam 2 is arranged near the neutral point of the bending stresses. This is evident from FIG. 1a wherein there is shown the distribution of the moments on the frame. As shown in FIG. 1a the maximum moment is applied at the corner joint of the frame.

Another advantage of the corner joint of the invention over known corner joints is that it is simple and therefore inexpensive to manufacture.

Corner joints according to the invention may be made several at a time either at the factory or at the assembly site, whereas the known types of corner joint can only be produced singly at the assembly site by nailing them together.

The various embodiments of the invention may be significantly modified, in particular as regards the number of layers in the corner joint. If the frame is to have a considerable free span, several layers will of course be needed for the corner joint.

The invention is not limited to a specific material in the remaining parts of the beams. In the embodiment illustrated, the other part of the horizontal beam merely consists partly of wood and partly of plywood, although it can consist entirely of wood or entirely of plywood.

What I claim is:

1. A laminated corner joint between two timber beams which are substantially perpendicular to each other and lie in a common plane, said joint comprising a plurality of layers extending parallel to the plane of the beams, the layers of each beam being overlapped and adhesively secured in succession adjacent the corner between the two beams, at least one layer of each beam being constituted at least in part of a plywood panel having grain running in the same direction as the associated beam and an elongated plank secured along an end edge of the plywood panel and continuing into the corresponding layer of the other beam along its longitudinal edge.

2. A corner joint as claimed in claim 1 wherein said planks are relatively positioned with respect to the plywood panels of said layers to be disposed at the longitudinal outer marginal edges of the plywood panels of adjacent layers.

3. A corner joint as claimed in claim 1 wherein one of said layers includes longitudinal planks which extend from the associated plywood panel in the lengthwise direction of both beams.

4. A corner joint as claimed in claim 1 wherein at least one other layer of each beam is constituted by a plywood panel coextensive with one beam and having elongated planks secured to said latter plywood panel edge in end abutted relation and extending into the corresponding layer of the other beam.

References Cited

FOREIGN PATENTS 624,875   6/1949   Great Britain.

CARL W. TOMLIN, *Primary Examiner.*

WAYNE L. SHEDD, *Assistant Examiner.*